United States Patent [19]

Hoshino et al.

[11] Patent Number: 4,857,592
[45] Date of Patent: Aug. 15, 1989

[54] POLYVINYL CHLORIDE RESIN COMPOSITION

[75] Inventors: Mitsuru Hoshino, Iwaki; Haruhiko Yusa, Tokyo; Katsumi Suzuki, Iwaki, all of Japan

[73] Assignee: Kureha Kagaku Kogyo K. K., Japan

[21] Appl. No.: 159,407

[22] Filed: Feb. 11, 1988

[30] Foreign Application Priority Data

Feb. 13, 1987 [JP] Japan .................. 62-029729

[51] Int. Cl.$^4$ ............ C08L 27/06; C08L 51/04
[52] U.S. Cl. .................. 525/82; 525/83; 525/84; 525/85
[58] Field of Search ................ 525/82, 83, 84, 85

[56] References Cited

U.S. PATENT DOCUMENTS 4,624,987 11/1986 Hosoi et al. ............... 525/84

FOREIGN PATENT DOCUMENTS

| 46-31462 | 9/1971 | Japan . |
| 46-42021 | 12/1971 | Japan . |
| 47-23648 | 7/1972 | Japan . |
| 47-23649 | 7/1972 | Japan . |
| 48-5787 | 2/1973 | Japan . |
| 51-150562 | 12/1976 | Japan . |
| 54-1584 | 1/1979 | Japan . |
| 57-212246 | 12/1982 | Japan . |

Primary Examiner—Lewis T. Jacobs
Attorney, Agent, or Firm—Lowe, Price, LeBlanc, Becker & Shur

[57] ABSTRACT

A polyvinyl chloride resin composition comprises 3–30 wt. % of a graft copolymer and 97–70 wt. % of a polyvinyl chloride resin and has highly-balanced properties between impact resistance, transparency and stress-whitening resistance and excellent processing characteristics. The graft copolymer is obtained by graft-polymerizing, in the presence of a latex containing greater than 75 but not exceeding 85 parts by weight of a rubbery butadiene-styrene copolymer formed of 65–85 wt. % of butadiene, 15–35 wt. % of styrene and 0–3 wt. % of crosslinkable monomer, (i) 5–24 parts by weight of a first monomer mixture as a first-stage component, said first monomer mixture being composed of 70–97 wt. % of methyl methacrylate and 30–3 wt. % of an alkyl acrylate whose alkyl group has 1–8 carbon atoms; and then (ii) 3–21 parts by weight of a second monomer mixture as a second-stage component, said second monomer mixture being composed of 97–100 wt % of styrene and 0–3 wt. % of crosslinkable monomer. The sum of the first and second monomer mixtures and the rubbery butadiene-styrene copolymer is 100 parts by weight. The monomers grafted in the first stage amount to 30–80 wt. % of the sum of the grafted monomers.

4 Claims, No Drawings

POLYVINYL CHLORIDE RESIN COMPOSITION

BACKGROUND OF THE INVENTION

1. Field of the Invention

This invention relates to a poly(vinyl chloride)-based (hereinafter referred to as "PVC-based" for the sake of brevity) resin composition, and more specifically to a PVC-based resin composition having highly-balanced properties between impact resistance, transparency and stress-whitening resistance and excellent processing characteristics.

2. Background of the Invention

PVC-based resins have a drawback that they are brittle to impact. As methods for improving this drawback, many proposals have heretofore been made that various graft copolymers obtained by graft-polymerizing one or more vinyl monomers such as styrene, methyl methacrylate and acrylonitrile in the presence of a rubbery butadiene-based polymer are blended in PVC-based resins. PVC-based resins according to these methods have been improved certainly in impact resistance, but still involve such a drawback that the inherent excellent transparency of the PVC-based resins has been impaired or when molded articles are bent or an impact is exerted on molded articles, portions subjected to such a stress are whitened (stress whitening) and their commercial values are hence impaired. Especially, the above drawback becomes more remarkable as the impact resistance become better. These properties can be attributed to the fact that the impact resistance of a PVC-based resin composition is dependent basically on the particle size of rubber particles in a rubbery polymer component which forms a graft copolymer. In order to enhance the impact resistance imparting ability of a graft copolymer, it is generally necessary to increase the particle size of a rubbery polymer to a suitable extent. In this case, the transparency tends to be impaired due to the increase of degree of scattering at interfaces between a PVC-based resin and particles of the graft copolymer dispersed in PVC-based resin. Even if the refractive index of the PVC-based resin and that of the graft copolymer are brought into confirmity as much as possible, the stress whitening is also liable to occur.

With a view toward obtaining a PVC-based resin composition excellent in impact resistance, transparency and stress-whitening resistance, a variety of attempts have hence been made on the composition of a rubbery polymer component, its particle size, the composition of components to be graft-polymerized, the method of graft polymerization, etc. as parameters of a graft copolymer to be blended.

As illustrative examples of the graft copolymer to be blended in the PVC-based resin, may be mentioned a graft copolymer obtained by coagulating a rubber latex to an appropriate extent and then graft-polymerizing styrene, methyl methacrylate or the like (Japanese Patent Publication No. 31462/1971 or 1584/1979); a graft polymer obtained by graft-polymerizing a monomer mixture of an alkyl methacrylate and an aromatic vinyl compound in the presence of a latex containing highly crosslinked rubbery butadiene-based polymer having a degree of swelling of not greater than 7 (Japanese Patent Laid-Open No. 212246/1982); a graft copolymer obtained by using an elastomer, which contains 1,3-butadiene, n-butyl acrylate and styrene at a specific content ratio, as a rubbery polymer component and then polymerizing one or more graft-copolymerization components in multi stages (Japanese Patent Publication No. 23648/1972 or 23649/1972 or Japanese Patent Laid-Open No. 150562/1976); a graft copolymer obtained by graft-polymerizing styrene or methyl methacrylate on a backbone polymer composed of butadiene, acrylonitrile, styrene and a crosslinkable monomer (Japanese Patent Publication No. 5787/1973); and a graft polymer obtained by graft-polymerizing an aromatic vinyl compound, methyl methacrylate, acrylonitrile or an acrylic acid ester on a rubbery polymer (Japanese Patent Publication No. 42021/1971).

However, these attempts cannot still be said to be satisfactory. It has hence been desired to develop a PVC-based resin composition which is still highly balanced between properties of impact resistance, transparency and stress-whitening resistance and is also superb in processing characteristics.

In addition, PVC-based resin compositions containing these graft copolymers are accompanied by processing drawbacks such that their impact resistance is reduced when formed or molded at higher temperatures or fish eyes of an ungelled matter are formed to impair the external appearance when formed or molded under conditions of a low kneading degree. There is hence an outstanding demand for a PVC-based resin composition which can exhibit high impact strength stably and has excellent external appearance over a wide range of forming or molding conditions.

OBJECT AND SUMMARY OF THE INVENTION

An object of this invention is to overcome the above-mentioned drawbacks of the prior art and to provide a PVC-based resin composition which is balanced still highly in various properties and is also excellent in processing characteristics.

The above-described object of this invention can be achieved by using a graft copolymer of a specific structure as a modifier for a PVC-based resin. By the present invention, is hence obtained a PVC-based resin composition having highly-balanced properties between impact resistance, transparency add stress-whitening resistance and excellent processing characteristics.

In one aspect of this invention, there is thus provided a PVC-based resin composition comprising 3–30 wt. % of a graft copolymer and 97–70 wt. % of a PVC-based resin and having highly-balanced properties between impact resistance, transparency and stress-whitening resistance and excellent processing characteristics, said graft copolymer having been obtained by graft-polymerizing, in the presence of a latex containing 70–85 parts by weight of a rubbery butadiene-based polymer formed of 65–85 wt. % of butadiene, 15–35 wt. % of styrene and 0–3 wt. % of crosslinkable monomer, (i) 5–24 parts by weight of a first monomer mixture as a first-stage component, said first monomer mixture being composed of 70–97 wt. % of methyl methacrylate and 30–3 wt. % of an alkyl acrylate whose alkyl group has 1–8 carbon atoms; and then (ii) 3–21 parts by weight of a second monomer mixture as a second-stage component, said second monomer mixture being composed of 97–100 wt. % of styrene and 0–3 wt. % of crosslinkable monomer, the sum of said first and second monomer mixtures and said rubbery butadiene-based polymer being 100 parts by weight, and the monomers grafted in the first stage amounting to 30–80 wt. % of the sum of the grafted monomers.

The graft copolymer useful in the practice of this invention needs to satisfy the following three fundamental requirements.

Namely, the first requirement resides in the rubber content as high as 70-85 wt. %.

The second requirement resides in that the monomer mixture composed principally of methyl methacrylate is graft-polymerized directly with the rubbery polymer component as a first-stage component, and styrene which may optionally contain a crosslinkable monomer is then graft-polymerized as a second stage component, and the monomers in the first stage amount to 30-80 wt. % of all the monomers grafted.

The third requirement resides in the combined use of methyl methacrylate and a specific proportion of an alkyl acrylate as components in the first stage of the graft copolymerization.

The object of this invention can be attained by fulfilling all the above requirements. Namely, the graft copolymer useful in the practice of this invention is not very unique as far as the individual components employed for its production are concerned but owing to the selection and fulfillment of the above-described specific requirements, its use as a modifier for a PVC-based resin can surprisingly provide a PVC-based resin composition having highly-balanced properties between impact resistance, transparency and stress-whitening resistance and excellent processing characteristics.

DETAILED DESCRIPTION OF THE INVENTION

Certain features of the present invention will hereinafter be described in detail.

Rubbery butadiene-based polymer

The rubbery butadiene-based polymer useful in the practice of this invention can be obtained by emulsion-polymerizing a monomer mixture composed of 65-85 wt. % of butadiene, 15-35 wt. % of styrene and 0-3 wt. % of a crosslinkable monomer.

Any butadiene proportions smaller than 65 wt. % will result in a reduction to the impact resistance imparting ability, whereas any butadiene proportions greater than 85 wt. % will lead to lowered transparency. It is hence not preferable to use butadiene in any proportion outside the above range. On the other hand, the crosslinkable monomer is effective in enhancing the transparency and stress-whitening resistance and is used in a proportion not greater than 3 wt. %, preferably, in a suitable proportion within a range of 0.1-2.5 wt. %. It is however not preferable to add the crosslinkable monomer in any proportion greater than 3 wt. %, because such an excess proportion will result in a reduction to the impact resistance imparting ability.

As a crosslinkable monomer which is usable, is selected that copolymerizable with butadiene and styrene, for example, divinylbenzene, ethylene glycol dimethacrylate, diethylene glycol dimethacrylate, triethylene glycol dimethacrylate, tetraethylene glycol dimethacrylate, 1,3-butylene glycol dimethacrylate, ethylene glycol diacrylate, diethylene glycol diacrylate, triethylene glycol diacrylate, tetraethylene glycol diacrylate, 1,3-butylene glycol diacrylate, trimethylolpropane trimethacrylate, trimethylolpropane triacrylate, or the like.

The rubbery butadiene-based polymer is used in a range of 70-85 wt. %, preferably, in a range in excess of 75 wt. % but not greater than 85 wt. %, both, based on the graft copolymer. It is an essential requirement for allowing a PVC-based resin composition to have highly-balanced properties between impact resistance, transparency and stress-whitening resistance that the proportion of the rubbery polymer component is increased to such a high level in the present invention.

Most of graft copolymers as impact resistance modifiers had a rubbery polymer content not higher than 70 wt. % in the past. As one of reasons for this tendency, may be mentioned that when the proportion of the rubbery polymer component is increased simply, the impact resistance of the resulting resin composition tends to increase but its transparency tends to decrease. It has been found in the present invention that even if the proportion of the rubbery polymer component is increased to improve the impact resistance, the transparency will not be deteriorated by choosing the kinds and proportions of components to be grafted and the order of their graft polymerization, in other words, by fulfilling the second and third requirements.

The present invention can therefore allow to increase the proportion of the rubbery polymer component, thereby bringing about an advantage that the impact resistance can be increased without need for enlargement of the rubber particle size which would lower the transparency and stress-whitening resistance.

If the proportion of the rubbery butadiene-based polymer should be smaller than 70 wt. %, the impact resistance imparting ability will be reduced. On the other hand, any proportions greater than 85 wt. % will lead to greater impact resistance imparting ability but will lower the ability to impart stress-whitening resistance and moreover will render the resulting graft copolymer susceptible to agglomeration upon acid-coagulation (salting-out) of the latex and drying of the resultant wet cake. It is hence not preferable to use the rubbery butadiene-based polymer in any proportion outside the above range.

The rubbery butadiene-based polymer latex useful in the practice of this invention can be obtained by emulsion-polymerization in a manner known per se in the art. Although no particular limitation is necessarily imposed on the particle size of the rubbery polymer, 600-3,000 Å is useful. A rubber polymer latex having such a particle size may be prepared by seed polymerization or an addition of a known coagulant such as acid or salt and hence coagulating and coarsening the rubber particles.

[Graft-polymerized components]

In the presence of a latex containing the above-described rubbery butadiene-based polymer in a proportion of 70-85 parts by weight, graft components are graft-copolymerized in two stages so as to bring the sum of the graft components and the rubbery butadiene-based polymer into 100 parts by weight.

As a first stage, 5-24 parts by weight, preferably, 7-20 parts by weight of a monomer mixture composed of 70-97 wt. %, preferably, 80-90 wt. % of methyl methacrylate and 30-3 wt. %, preferably, 20-10 wt. % of an alkyl acrylate are graft-polymerized first of all.

The alkyl acrylate employed as a co-monomer along with methyl methacrylate serves to accelerate the gelation of the PVC-based resin composition and hence provides a homogeneous melt promptly and easily even when the resin composition is formed or molded under low kneading-degree conditions. The alkyl acrylate also exhibits such effects that the occurrence of fish eyes of an ungelled matter can be prevented and moreover, the reduction of the impact resistance is minimized and the exhibition of high impact strength is ensured even when the resin composition is formed or molded at a high temperature.

If the proportion of the alkyl acrylate should be smaller than 3 wt. % of the components graft-polymerized in the first stage, the above-mentioned effects will not be exhibited fully. On the other hand, any proportions greater than 30 wt. % will render the resultant graft copolymer susceptible to agglomeration. Any alkyl acrylate proportions outside the above range are hence not preferred.

As a usable alkyl acrylate, an alkyl acrylate whose alkyl group contains 1–8 carbon atoms is chosen. For example, methyl acrylate, ethyl acrylate, propyl acrylate, n-butyl acrylate, iso-butyl acrylate, t-butyl acrylate, 2-ethylhexyl acrylate, n-octyl acrylate and the like may be used either singly or in combination.

It is necessary to control the total proportion of the components graft-polymerized in the first stage within 30–80 wt. %, preferably, 40–70 wt. % of the whole graft-polymerized components. If the proportion of the components graft-polymerized in the first stage should be smaller than 30 wt. %, the resulting graft polymer will have poor compatibility with PVC-based resins and its ability to impart impact resistance, especially, stress-whitening resistance will be reduced. If the proportion should exceed 80 wt. % on the other hand, the resulting PVC-based resin composition will be low in impact resistance and transparency. Next, as a second stage, 3–21 parts by weight, preferably, 5–17 parts by weight of a monomer or monomer mixture consisting of 97–100 wt. %, preferably, 97.5–99.9 wt. % of styrene and 0–3 wt. %, preferably, 0.1–2.5 wt. % of a crosslinkable monomer is graft-polymerized.

It is primarily to improve the clarity of the mixture of the graft copolymer and PVC-based resin that styrene is used as a graft polymerization component in the second stage.

By the addition of the crosslinkable monomer, the degree of grafting of the graft monomers on the rubber particles is improved and the compatibility between the graft polymer and PVC-based resin is increased, so that the stress-whitening resistance of the PVC-based resin composition can be improved further. Any proportions of the crosslinkable monomer in excess of 3 wt. % will result in a reduction to impact resistance and are hence not preferable.

As a crosslinkable monomer which is usable, a suitable crosslinkable monomer is chosen from those copolymerizable with styrene. As a specific example, may be mentioned the crosslinkable monomer which is used upon production of the above-mentioned rubbery butadiene-based polymer.

The sum of components graft-polymerized in the second stage is required to amount to 20–70 wt. %, preferably, 30–60 wt. % of the whole components grafted. If the total proportion of the components graft-polymerized in the second stage should be smaller than 20 wt. %, the resulting PVC-based resin composition will be lowered in impact resistance and transparency. Any total proportions greater than 70 wt. % will lead to reduced stress-whitening resistance and impact resistance and are hence not preferred.

Graft copolymerization method

The graft copolymer useful in the practice of this invention needs to be obtained by graft-polymerizing methyl methacrylate and an alkyl acrylate as first-stage components and then graft-polymerizing styrene, which may optionally contain a crosslinkable monomer, as a second-stage component.

If all of these graft co-monomers should be graft-polymerized on the rubbery polymer in a single stage, it will be possible to obtain a PVC-based resin composition only, which will be excellent in impact resistance (Izod impact strength) but will be inferior in sheet strength, transparency and stress-whitening resistance, even when the resultant graft copolymer is blended with a PVC-based resin.

If the order of graft copolymerization should be reversed and styrene which may optionally contain a crosslinkable monomer should be graft-polymerized in the first stage, it will be possible to obtain a PVC-based resin composition only, which will be comparable substantially in Izod impact strength with the PVC-based resin composition of this invention but will be inferior in sheet strength, even when the resultant graft copolymer is blended with a PVC-based resin.

If styrene should be used as an additional component for the graft polymerization in the first stage in place of portions of methyl methacrylate and the alkyl acrylate and methyl methacrylate and the alkyl acrylate should be used as components for the graft polymerization in the second stage, it will be feasible only to obtain a PVC-based resin composition inferior in impact resistance, transparency and stress whitening resistance.

Here, the term "sheet strength" as used herein is used to evaluate the state of damage when a test piece (sheet) is repeatedly caused to slap an iron plate or the like. It indicates the practical strength of a resin composition, which cannot be evaluated by an impact resistance test, namely, Izod impact strength alone.

PVC-based resin

The PVC-based resin, the other component employed in the present invention, is PVC resin or a copolymer of vinyl chloride and 30 wt. % or less of a copolymerizable monomer such as vinyl bromide, vinylidene chloride, vinyl acetate, acrylic acid, methacrylic acid or ethylene.

[Blending proportions]

In the present invention, the graft copolymer is blended to a proportion of 3–30 wt. % relative to 97–70 wt. % of the PVC-based resin.

If the blending proportion of the graft copolymer should be lower than 3 wt. %, its addition will not bring about any substantial effects. Any proportions greater than 30 wt. % will however result in a loss of other excellent properties of the PVC-based resin and moreover, will not be economical.

ADVANTAGES OF THE INVENTION

According to the present invention, it is possible to obtain a PVC-based resin composition balanced more highly between impact resistance, transparency and stress-whitening resistance than conventional PVC-based resin compositions. Furthermore, the PVC-based resin composition of this invention is free of fish eyes of an ungelled matter and its impact resistance is not lowered even by high-temperature molding, so that the PVC-based resin composition has excellent processing characteristics.

EMBODIMENTS OF THE INVENTION

The present invention will hereinafter be described specifically by the following Examples and Comparative Examples. It should however be borne in mind that the present invention is not necessarily limited to the following Examples. All designations of "part" will mean parts by weight in the following Examples.

EXAMPLE 1 & COMPARATIVE EXAMPLE 1:

The following components were charged in a polymerization reactor which had been purged with nitrogen gas. The contents were reacted at 50° C. for 13 hours under stirring, thereby obtaining a rubber latex of a butadiene-styrene copolymer.

|  | Parts |
| --- | --- |
| Deionized water | 267 |
| Potassium oleate | 0.37 |
| Ferrous sulfate | 0.003 |
| Disodium ethylenediamine tetraacetate | 0.005 |
| Sodium pyrophosphate | 0.17 |
| Rongalit (trade mark) | 0.036 |
| Diisopropylbenzene hydroperoxide | 0.090 |
| Butadiene | 74 |
| Styrene | 26 |
| Divinylbenzene | 1 |

After the above reaction, the polymerization yield was 98% and the average particle size of rubber particles was 1,100 Å.

Using the above rubber latex, components shown in Table 1 were charged as first-stage components in the polymerization reactor. After purging the unoccupied space with nitrogen gas, the contents were heated at 60° C. for 3 hours under stirring. Components also shown in Table 1 were thereafter added as second stage components. After polymerization at 60° C. for 2 hours, final additives were incorporated and the polymerization was continued for further 4 hours to complete the graft polymerization.

The yield was approximately 100% based on the charged monomers. Subsequent to an addition of an antioxidant to the resultant latex, the latex was coagulated with an aqueous solution of hydrochloric acid, followed by dewatering and drying steps to obtain a graft copolymer.

Fifteen parts of the thus-obtained graft copolymer, 2 parts of a tin-containing stabilizer, 1 part of a lubricant and 1 part of a polymer processing aid were added to 100 parts of PVC resin having an average polymerization degree of 700. The resultant mixture was kneaded at 190° C., which was close to the actual molding temperature, for 3 minutes by means of rolls, followed by press-forming at 200° C. to prepare test pieces. Physical properties of the test pieces are shown in Table 2. For the sake of comparison, physical properties of test pieces obtained without the graft copolymer are also shown under Comparative Example 1 in Table 2. The physical properties of Table 2 were measured by the following methods respectively.

Izod impact strength

JIS K-7110 was followed (thickness: 6 mm; V-notched; measurement temperature: 23° C.).

Sheet strength:

Each test piece (17.5 mm×2.5 mm×0.5 mm) was mounted on a rotary shaft with the length of the test piece extending in perpendicular with the rotary shaft. At a revolution speed of 730 rpm, a free end portion of the test piece was caused to slap an iron plate for 5 seconds. The state of its damage was ranked in accordance with the 5-point system. 5 . . . free of damage; 4 . . . cracked; 3 . . . cracked with not more than one half of the free end portion being broken away; 2 . . . more than one half of the free end portion was broken away; 1 . . . the free end portion was completely broken. Each value indicates the arithmetic mean of individual rankings of ten test pieces (n=10) in accordance with the 5-point system.

Transparency Based on JIS K-6745, both parallel ray transmittance (Tp,%) and haze (Hz,%) were measured (thickness: 3 mm).

Stress-whitening resistance

A falling ball (tip diameter: 6.4 mm; weight; 500 g) was caused to fall from a height of 50 cm against each pressed sheet of 1 mm thick. The degree of resultant whitening was measured in terms of whiteness (W,%) by means of a color difference meter.

EXAMPLES 2-4 & COMPARATIVE EXAMPLES 2-3

Using the rubber latex obtained in Example 1, components shown in Table 1 were charged separately and graft-polymerized in the same manner as in Example 1 to obtain graft copolymers having different rubber contents.

Using those graft copolymers separately, test pieces were then prepared in the same manner as in Example 1 and their properties were evaluated. Results are shown in Table 2.

COMPARATIVE EXAMPLE 4

Using the rubber latex of the butadiene-styrene copolymer obtained in Example 1, 0.062 parts of sodium dioctylsulfosuccinate and 0.54 parts of potassium oleate were added to 65 parts of the rubber component. After stirring the resultant mixture thoroughly, 10 parts of a 0.18% aqueous solution of hydrochloric acid were added under stirring so that rubber particles were micro-agglomerated and coarsened. Thereafter, a 2% aqueous solution of sodium hydroxide was added for stabilization (pH 10). By the above micro-agglomeration and coarsening, a rubber latex having an average particle size of 1,300 Å was obtained without occurrence of any substantial coagulum.

Components shown in Table 1 were added to the rubber latex and a graft copolymer was obtained in the same manner as in Example 1. Using the graft copolymer, test pieces were prepared in the same manner as in Example 1 and their properties were evaluated. Results are shown in Table 2.

As apparent from Table 2, it is understood that the compositions of this invention were improved in impact resistance and underwent less stress-whitening without impairing the transparency of the PVC resin. It is also appreciated that compared with the composition composed of the graft copolymer having the small rubber content, the compositions of the present invention were superior in the balancing of individual properties of impact resistance, transparency and stress-whitening resistance.

polymers separately at 160° C. for 3 minutes by means of rolls and then press-forming same at 200° C.

TABLE 1

|  |  | Ex. 1 | Ex. 2 | Ex. 3 | Ex. 4 | Comp. Ex. 2 | Comp. Ex. 3 | Comp. Ex. 4 |
| --- | --- | --- | --- | --- | --- | --- | --- | --- |
| First stage | Rubber latex (as rubber content) | 70 | 76 | 80 | 85 | 65 | 90 | 65 |
|  | Potassium oleate | 0.64 | 0.62 | 0.60 | 0.59 | 0.66 | 0.57 | 0.66 |
|  | Methyl methacrylate | 12 | 9.6 | 8 | 6 | 14 | 4 | 14 |
|  | Ethyl acrylate | 3 | 2.4 | 2 | 1.5 | 3.5 | 1 | 3.5 |
|  | DHP | 0.075 | 0.060 | 0.050 | 0.038 | 0.088 | 0.025 | 0.088 |
|  | Rongalit | 0.075 | 0.060 | 0.050 | 0.038 | 0.088 | 0.025 | 0.088 |
| Second stage | Styrene | 15 | 12 | 10 | 7.5 | 17.5 | 5 | 17.5 |
|  | Divinylbenzene | 0.15 | 0.12 | 0.1 | 0.075 | 0.175 | 0.05 | 0.175 |
|  | DHP | 0.075 | 0.060 | 0.050 | 0.038 | 0.088 | 0.025 | 0.088 |
|  | Rongalit | 0.075 | 0.060 | 0.050 | 0.038 | 0.088 | 0.025 | 0.088 |
| FA | DHP | 0.075 | 0.060 | 0.050 | 0.038 | 0.088 | 0.025 | 0.088 |
|  | Rongalit | 0.075 | 0.060 | 0.050 | 0.038 | 0.088 | 0.025 | 0.088 |

DHP: Diisopropylbenzene hydroperoxide.
FA: Final addition.

TABLE 2

|  | Rubber content of graft copolymer (wt. parts) | Rubber particle size of graft copolymer (Å) | Izod impact strength (Kg · cm/cm) | Sheet strength | Transparency Tp (%) | Hz (%) | Stress-whitening resistance (W, %) |
| --- | --- | --- | --- | --- | --- | --- | --- |
| Comp. Ex. 1 | — | — | 1 | 1 | 89 | 1.2 | 8 |
| Comp. Ex. 2 | 65 | 1100 | 2 | 3.1 | 88 | 1.3 | 25 |
| Ex. 1 | 70 | 1100 | 10 | 4.3 | 88 | 1.4 | 14 |
| Ex. 2 | 76 | 1100 | 18 | 5 | 88 | 1.3 | 14 |
| Ex. 3 | 80 | 1100 | 19 | 5 | 88 | 1.4 | 16 |
| Ex. 4 | 85 | 1100 | 17 | 5 | 87 | 1.5 | 20 |
| Comp. Ex. 3 | 90 | 1100 | 16 | 4.8 | 86 | 2.1 | 39 |
| Comp. Ex. 4 | 65 | 1300 | 21 | 3.3 | 87 | 1.7 | 30 |

EXAMPLES 5-7 & COMPARATIVE EXAMPLES 5-6

In a polymerization reactor, were charged 78 parts (as rubber content) of the rubber latex obtained in Example 1, 0.61 parts of potassium oleate, 11 parts of a monomer mixture of methyl methacrylate and ethyl acrylate (whose mixing ratio was varied as shown under Examples 5, 6 and 7 in Table 3), 0.055 parts of diisopropylbenzene hydroperoxide and 0.055 parts of Rongalit. After purging the polymerization reactor with nitrogen gas, the contents were polymerized at 60° C. for 3 hours under stirring. Thereafter, 11 parts of styrene, 0.11 parts of divinylbenzene, 0.055 parts of diisopropylbenzene hydroperoxide, 0.055 parts of Rongalit were added, followed by polymerization at 60° C. for 2 hours. Added further were 0.055 parts of diisopropylbenzene hydroperoxide and 0.055 parts of Rongalit, followed by polymerization for an additional four hours to complete the graft polymerization. The polymerization yield in each stage was approximately 100% based on the monomers charged in the corresponding stage. Graft copolymers were separately obtained in the same manner as in Example 1. Using the graft copolymers separately, test pieces were prepared in the same manner as in Example 1 and their properties were evaluated. Izod impact strength was additionally evaluated with respect to test pieces obtained respectively by kneading the graft co-polymers separately at 160° C. for 3 minutes by means of rolls and then press-forming same at 200° C.

Further, the above compositions were separately formed at 200° C. into sheets of 0.1 mm thick by means of a 40-mmφ extruder equipped with a T-die. The state of development of fish eyes was observed. The gelling velocity of each of the above-described compositions was determined in terms of the time which was required until a maximum torque was reached when the composition was kneaded under conditions of a jacket temperature of 120° C., rotor revolution number of 50 rpm and filled amount of 52 g by means of a Brabender Plasti-Corder (trade mark). Results are shown in Table 3. It is understood from Table 3 that an introduction of an acrylic acid ester can provide a PVC-based resin composition excellent in processing characteristics, for example, can improve the Izod impact strength to a significant extent, can make smaller the reduction of the Izod impact strength when formed or molded at high temperatures, can provide high Izod impact strength stably over a wide forming or molding temperature range, and can also promote gelation to prevent occurrence of fish eyes. However, the tendency that the transparency and sheet strength would be lowered is observed, if such an alkyl acrylate is introduced in a large amount as in the Comparative Examples. Furthermore, the graft polymer becomes susceptible to agglomeration, leading to another disadvantage that special care is needed upon blending the graft polymer with PVC resin.

TABLE 3

| | Components of graft copolymer (wt. parts) | | | Izod impact strength (Kg cm/cm) | | Sheet strength | Transparency | | Stress-whitening resistance (W, %) | Fish eyes | Gelling velocity (min.) |
|---|---|---|---|---|---|---|---|---|---|---|---|
| | Rubber | 1st-stage grafting MMA/EA | 2nd-stage grafting ST/DVB | Kneaded at 160 C. | Kneaded at 190 C. | | Tp (%) | Hz (%) | | | |
| Comp. Ex. 5 | 78 | 11/0 | 11/0.11 | 50 | 3 | 5 | 88 | 1.3 | 19 | many | 4.6 |
| Ex. 5 | 78 | 9.9/1.1 | 11/0.11 | 57 | 10 | 5 | 88 | 1.3 | 16 | some | 2.9 |
| Ex. 6 | 78 | 8.8/2.2 | 11/0.11 | 64 | 19 | 5 | 88 | 1.3 | 15 | almost no fish eyes | 2.2 |
| Ex. 7 | 78 | 7.7/3.3 | 11/0.11 | 72 | 23 | 4.9 | 88 | 1.3 | 14 | almost no fish eyes | 2.0 |
| Comp. Ex. 6 | 78 | 6.6/4.4 | 11/0.11 | 70 | 21 | 4.8 | 87 | 1.5 | 16 | almost no fish eyes | 1.9 |

MMA: methyl methacrylate, EA: ethyl acrylate, ST: styrene, DVB: divinylbenzene.

EXAMPLES 8-10 & COMPARATIVE EXAMPLES 7-8

The rubber latex obtained in Example 1 was used. Components shown in Table 4 were separately charged in a polymerization reactor. In the same manner as in Example 1, were separately obtained graft copolymers whose monomers were used in different ratios in the first and second stages of the graft polymerization. In exactly the same manner as in Example 1, test pieces were separately prepared and their properties were evaluated. Results are shown in Table 5.

From Table 5, it is understood that the transparency was good but the stress-whitening resistance was lowered significantly when the components of the first stage of the graft polymerization were reduced and their proportion in the whole grafted components was low. Moreover, the composition emitted strong bluish fluorescence.

It is also understood that the transparency and Izod impact strength are lowered when the the components of the first stage of the graft polymerization are increased on the contrary and their proportion in the whole grafted components is high. The compositions of the Examples are excellent in the balancing of the respective properties, i.e., impact resistance, transparency and stress-whitening resistance.

TABLE 4

Unit: part(s)

| | | Comp. Ex. 7 | Ex. 8 | Ex. 9 | Ex. 10 | Comp. Ex. 8 |
|---|---|---|---|---|---|---|
| First stage | Rubber latex (as rubber content) | 78 | 78 | 78 | 78 | 78 |
| | Potassium oleate | 0.61 | 0.61 | 0.61 | 0.61 | 0.61 |
| | Methyl methacrylate | 4 | 8.8 | 10.4 | 13.6 | 16 |
| | Ethyl acrylate | 1 | 2.2 | 2.6 | 3.4 | 4 |
| | DHP | 0.025 | 0.055 | 0.065 | 0.085 | 0.100 |
| | Rongalit | 0.025 | 0.055 | 0.065 | 0.085 | 0.100 |
| Second stage | Styrene | 17 | 11 | 9 | 5 | 2 |
| | Divinylbenzene | 0.17 | 0.11 | 0.09 | 0.05 | 0.02 |
| | DHP | 0.085 | 0.055 | 0.045 | 0.025 | 0.010 |
| | Rongalit | 0.085 | 0.055 | 0.045 | 0.025 | 0.010 |
| FA | DHP | 0.085 | 0.055 | 0.045 | 0.025 | 0.010 |
| | Rongalit | 0.085 | 0.055 | 0.045 | 0.025 | 0.010 |

DHP: Diisopropylbenzene hydroperoxide.
FA: Final addition.

TABLE 5

| | Components of graft copolymer (wt. parts) | | | Izod impact strength (Kg cm/cm) | Sheet strength | Transparency | | Stress-whitening resistance (W, %) |
|---|---|---|---|---|---|---|---|---|
| | Rubber | 1st-stage grafting MMA/EA | 2nd-stage grafting ST/DVB | | | Tp (%) | Hz (%) | |
| Comp. Ex. 7 | 78 | 4/1 | 17/0.17 | 16 | 4.5 | 89 | 1.1 | 37 |
| Ex. 8 | 78 | 8.8/2.2 | 11/0.11 | 19 | 5 | 88 | 1.3 | 15 |
| Ex. 9 | 78 | 10.4/2.6 | 9/0.09 | 17 | 5 | 86 | 2.0 | 13 |
| Ex. 10 | 78 | 13.6/3.4 | 5/0.05 | 14 | 5 | 84 | 3.5 | 13 |
| Comp. Ex. 8 | 78 | 16/4 | 2/0.02 | 10 | 5 | 80 | 4.2 | 12 |

MMA: methyl methacrylate, EA: ethyl acrylate, ST: stryrene, DVB: divinylbenzene.

EXAMPLE 11 & COMPARATIVE EXAMPLES 9-11

In order to investigate possible effects depending on differences in the manner of graft polymerization, components shown in Table 6 were charged separately along with the rubber latex, which had been obtained in Example 1, into a polymerization reactor. The contents were separately reacted at 60° C., under stirring, in a nitrogen gas atmosphere, for a time period indicated in Table 6, thereby obtaining graft copolymers. In the same manner as in Example 1, test pieces were prepared using these graft copolymers separately and their properties were evaluated. Results are shown in Table 7. It is appreciated from Table 7 that a graft polymer obtained in accordance with the specific two-stage process of this invention as a graft polymerization process can afford a resin composition excellent in the balancing of individual properties of impact resistance, transparency and stress-whitening resistance.

Namely, it is understood that when the order of graft polymerization is reversed relative to the graft polymerization process of this invention (Comparative Example 9), a PVC-based resin composition with the resultant copolymer blended therein will have inferior sheet strength; in the case of single-stage polymerization (Comparative Example 10), the Izod impact strength will be excellent but the sheet strength, transparency and stress-whitening resistance will be poor; when portions of methyl methacrylate and ethyl acrylate are used in combination with styrene (Comparative Example 11), the impact resistance, transparency and stress-whitening resistance will be poor; and in all the above cases, the resulting PVC-based resin compositions will be inferior in the balancing of individual properties of impact resistance, transparency and stress-whitening resistance.

TABLE 6

| | | Ex. 11 | Comp. Ex. 9 | Comp. Ex. 10 | Comp. Ex. 11 |
|---|---|---|---|---|---|
| First stage | Rubber latex (as rubber content) | 78 | 78 | 78 | 78 |
| | Potassium oleate | 0.61 | 0.61 | 0.61 | 0.61 |
| | Methyl methacrylate | 9 | — | 9 | 4.5 |
| | Ethyl acrylate | 2 | — | 2 | 1 |
| | Styrene | — | 11 | 11 | 11 |
| | Divinylbenzene | — | 0.11 | 0.11 | 0.11 |
| | DHP | 0.055 | 0.055 | 0.11 | 0.083 |
| | Rongalit | 0.055 | 0.055 | 0.11 | 0.083 |
| | DHP* | — | 0.055 | 0.055 | 0.055 |
| | Rongalit* | — | 0.055 | 0.055 | 0.055 |
| Second stage | Methyl methacrylate | — | 9 | — | 4.5 |
| | Ethyl acrylate | — | 2 | — | 1 |
| | Styrene | 11 | — | — | — |
| | Divinylbenzene | 0.11 | — | — | — |
| | DHP* | 0.055 | — | — | — |
| | Rongalit* | 0.055 | — | — | — |
| Polymerization time: | | | | | |
| First stage | | 3 | 6 | 6 | 6 |
| Second stage | | 6 | 3 | — | 3 |

*Added two hours after the initiation of the polymerization. DHP: Diisopropylbenzene hydroperoxide

TABLE 7

| | Components of graft copolymer (wt. parts) | | | | | | | | Izod impact strength (Kg cm/cm) | Sheet strength | Transparency | | Stress-whitening resistance (W, %) |
|---|---|---|---|---|---|---|---|---|---|---|---|---|---|
| | 1st-stage grafting | | | | 2nd-stage grafting | | | | | | Tp (%) | Hz (%) | |
| | Rubber | MMA | EA | ST | DVB | MMA | EA | ST | DVB | | | | | |
| Ex. 11 | 78 | 9 | 2 | — | — | — | — | 11 | 0.11 | 17 | 5 | 88 | 1.3 | 14 |
| Comp. Ex. 9 | 78 | — | — | 11 | 0.11 | 9 | 2 | — | — | 18 | 3.5 | 88 | 1.2 | 17 |
| Comp. Ex. 10 | 78 | 9 | 2 | 11 | 0.11 | — | — | — | — | 24 | 4.1 | 86 | 1.9 | 33 |
| Comp. Ex. 11 | 78 | 4.5 | 1 | 11 | 0.11 | 4.5 | 1 | — | — | 15 | 4.0 | 87 | 1.6 | 27 |

MMA: methyl methacrylate, EA: ethyl acrylate, ST: styrene, DVB: divinylbenzene.

What is claimed is:

1. A polyvinyl chloride resin composition comprising 3-30 wt. % of a graft copolymer and 97-70 wt. % of a polyvinyl chloride resin and having highly-balanced properties between impact resistance, transparency and stress-whitening resistance and excellent processing characteristics, said graft copolymer having been obtained by graft-polymerizing, in the presence of a latex containing greater than 75 but not exceeding 85 parts by weight of a rubbery butadiene-styrene copolymer, formed of 65-85 wt. % of butadiene, 15-35 wt. % of styrene and 0-3 wt. % of crosslinkable monomer, (i) 5-24 parts by weight of a first monomer mixture as a first-stage component, said first monomer mixture being composed of 70-97 wt. % of methyl methacrylate and 30-3 wt. % of an alkyl acrylate whose alkyl group has 1-8 carbon atoms; and then (ii) 3-21 parts by weight of a second monomer mixture as a second-stage component, said second monomer mixture being composed of 97-100 wt. % of styrene and 0-3 wt. % of a second crosslinkable monomer, the sum of said first and second monomer mixtures and said rubbery butadiene-styrene copolymer being 100 parts by weight, and the monomers grafted in the first stage amounting to 30-80 wt. % of the sum of the grafted monomers.

2. The polyvinyl chloride resin composition as claimed in claim 1, wherein the rubbery butadiene-styrene copolymer has an average particle size of 600-3,000 Å.

3. The polyvinyl chloride resin composition as claimed in claim 1, wherein the rubbery butadiene-styrene copolymer contains the crosslinkable monomer as a copolymerizable component in a range of 0.1-2.5 wt. %.

4. The polyvinyl chloride resin composition as claimed in claim 1, wherein the graft copolymer has been obtained by graft-polymerizing, in the presence of the latex containing greater than 75 but not exceeding 85 parts by weight of the rubbery butadiene-styrene copolymer, (i) 7-20 parts by weight of a first monomer mixture as a first-stage component, said first monomer mixture being composed of 80-90 wt. % of methyl methacrylate and 20-10 wt. % of an alkyl acrylate whose alkyl group has 1-8 carbon atoms; and then (ii) 5-17 parts by weight of a second monomer mixture as a second-stage component, said second monomer mixture being composed of 97.5-99.99 wt. % of styrene and 0.1-2.5 wt. % of crosslinkable monomer, the sum of said first and second monomer mixtures and said rubbery butadiene-styrene copolymer being 100 parts by weight, and the monomers grafted in the first stage amounting to 40-70 wt. % of the sum of the grafted monomers.

* * * * *